United States Patent [19]

Alexander et al.

[11] Patent Number: 5,712,932
[45] Date of Patent: Jan. 27, 1998

[54] DYNAMICALLY RECONFIGURABLE WDM OPTICAL COMMUNICATION SYSTEMS WITH OPTICAL ROUTING SYSTEMS

[75] Inventors: Stephen B. Alexander, Millersville; Victor Mizrahi, Columbia, both of Md.

[73] Assignee: CIENA Corporation, Linthicum, Md.

[21] Appl. No.: 512,294

[22] Filed: Aug. 8, 1995

[51] Int. Cl.$^6$ .................................................. G02B 6/293
[52] U.S. Cl. ............................ 385/24; 359/127; 359/130; 385/17
[58] Field of Search ........................... 385/10, 15, 16, 385/17, 18, 24, 27, 37; 359/124, 127, 128, 130

[56] References Cited

U.S. PATENT DOCUMENTS

| | | | |
|---|---|---|---|
| 4,807,227 | 2/1989 | Fujiwara et al. | 370/3 |
| 4,821,255 | 4/1989 | Kobrinski | 370/3 |
| 4,845,703 | 7/1989 | Suzuki | 370/3 |
| 4,910,726 | 3/1990 | Stanley | 370/3 |
| 4,927,225 | 5/1990 | Levinson | 350/96.18 |
| 4,957,340 | 9/1990 | Kirkby | 350/96.16 |
| 5,150,243 | 9/1992 | Suzuki | 359/110 |
| 5,212,578 | 5/1993 | Grimes et al. | 359/124 |
| 5,255,332 | 10/1993 | Welch et al. | 385/17 |
| 5,283,686 | 2/1994 | Huber | 359/337 |
| 5,317,439 | 5/1994 | Fatehi et al. | 359/110 |
| 5,394,265 | 2/1995 | Nagel et al. | 359/341 |
| 5,446,809 | 8/1995 | Fritz et al. | 385/17 |
| 5,504,827 | 4/1996 | Schimpe | 385/24 |

OTHER PUBLICATIONS

Briley, *Introduction to Telephone Switching*, (Addison-Wesley, London), c. 1983, pp. 119–139 (No Month).

Morey, *Optics & Photonics News*, Feb., 1994, pp. 8–14.

Glance, *OFC '95 Tech. Digest*, pp. 85–87 (1995) (No Month).

Chawki et al., *Elec. Lett.*, vol. 31, No. 6, 16 Mar. 1995, pp. 476–477.

Erdogan et al., *Elec. Lett.*, vol. 30, No. 10, pp. 780–781 (May 1994).

Nussbaum, *IEEE J. Select. Areas in Comm.*, vol. 6, No. 7, Aug., 1988, pp. 1036–1043.

MacDonald et al., *IEEE J. Select. Areas in Comm.*, vol. 6, No. 7, Aug., 1988, pp. 1141–1151.

Cassidy et al., *IEEE J. Select. Areas in Comm.*, vol. 6, No. 7, Aug., 1988, pp. 1044–1051.

(List continued on next page.)

*Primary Examiner*—John D. Lee
*Attorney, Agent, or Firm*—Margaret Burke

[57] ABSTRACT

The present invention provides reconfigurable wavelength division multiplexed systems which include configurable optical routing systems. Through the use of the configurable optical routing systems, optical channel traffic patterns may be flexibly and dynamically determined based on overall system conditions at any particular time. In one embodiment, a dynamically reconfigurable wavelength selector system for a wavelength division multiplexed optical communication system is provided. An optical transfer system includes an input port for receiving at least one of N optical channels from an optical transmission medium. An optical switch is coupled to a first output port of the optical transfer system and includes an optical filter comprised of at least one Bragg grating configured to reflect at least one optical channel toward the optical transfer system on a first switch path and a transmission medium for transmitting the N optical channels on a second switch path. The reflected optical channel exits the optical transfer system through the second output port. In another aspect, the present invention provides a wavelength division multiplexed communication system with optical cross-connects for routing selected optical traffic between a pair of optical paths. Plural optical transfer systems are provided which optically communicate with at least two optical transmission lines. Optical filters are provided such that the optical channels which are not reflected by the filter cross over to the opposite optical transmission line. The optical cross-connects are used as wavelength-selective crosspoints to create blocking or non-blocking switching networks.

12 Claims, 5 Drawing Sheets

OTHER PUBLICATIONS

Eng *IEEE J. Select. Areas in Comm.,* vol. 6, No. 7, Aug., 1988, pp. 1107–1116.

Kishimoto et al., *IEEE J. Select. Areas in Comm.,* vol. 6, No. 7, Aug., 1988, pp. 1248–1254.

Smyth, *IEEE J. Select. Areas in Comm.,* vol. 6, No. 7, Aug., 1988, pp. 1052–1062.

Wauters et al. *ECOC '94,* pp. 589–592 (Sep. 1994).

Jourdan et al., *ECOC '94,* pp. 563–566 (Sep. 1994).

Gillner et al., *ECOC '94,* pp. 1–4 (Sep. 1994).

Fioretti, *ECOC '94,* pp. 503–510 (Sep. 1994).

Depovere et al., *ECOC '94,* pp. 571–574 (Sep. 1994).

Giles et al., *Int'l. Conf. on Int. Optics and Optical Fibre Comm.,* Jun. 26–30, 1995 pp. 1–4.

Erdogan et al., *Laser Focus World,* Feb., 1994, pp. 1–5.

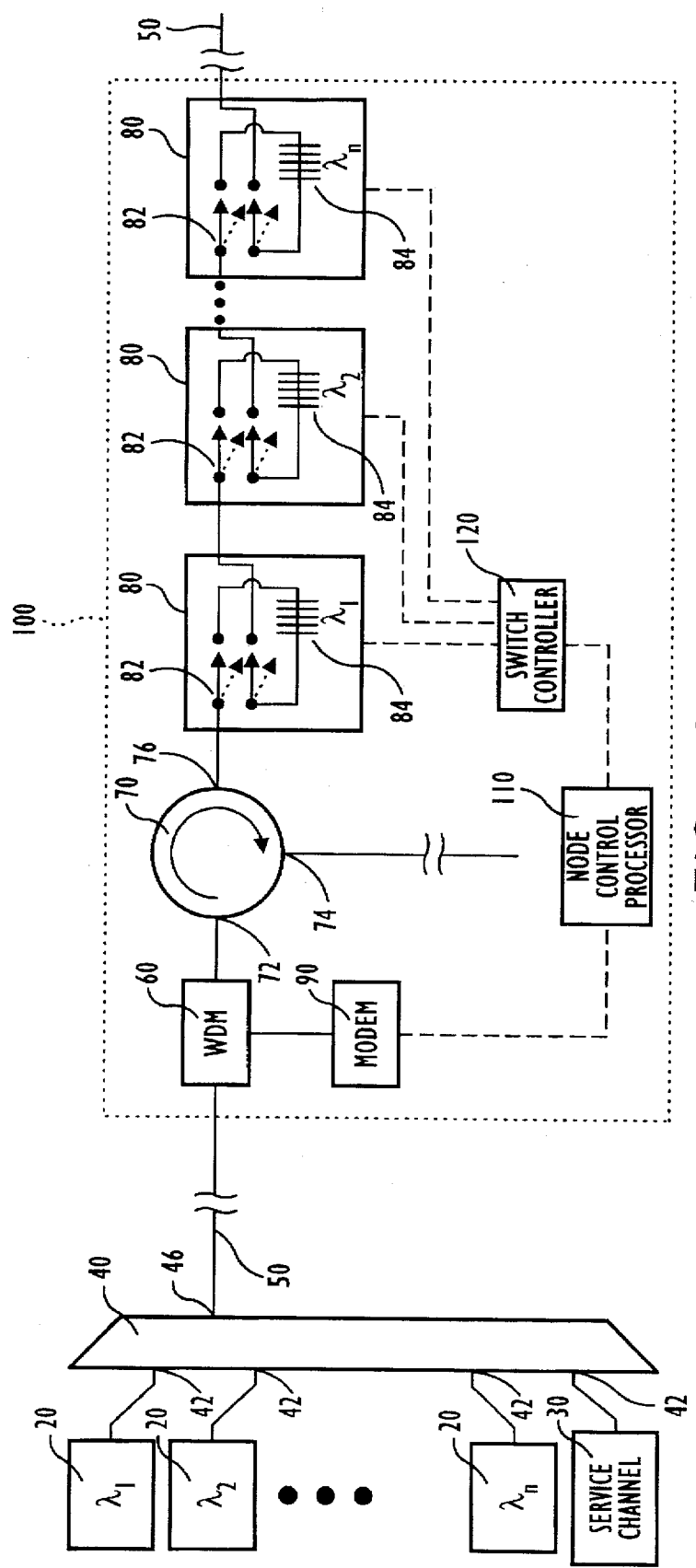
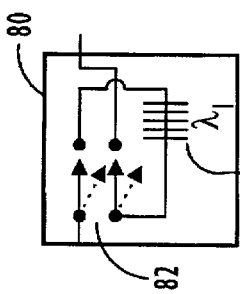
FIG. 1A
FIG. 1B 5,712,932

DYNAMICALLY RECONFIGURABLE WDM OPTICAL COMMUNICATION SYSTEMS WITH OPTICAL ROUTING SYSTEMS

FIELD OF THE INVENTION

The invention relates to wavelength division multiplexed optical communication systems and, more particularly, to wavelength division multiplexed optical communication systems which include dynamically reconfigurable wavelength routing systems for transferring selected optical channels between optical paths within the optical system.

BACKGROUND OF THE INVENTION

Optical communication systems are a substantial and fast-growing constituent of communication networks. The expression "optical communication system," as used herein, relates to any system which uses optical signals to convey information across an optical waveguiding medium. Such optical systems include, but are not limited to, telecommunications systems, cable television systems, and local area networks (LANs). Optical systems are described in Gowar, Ed. *Optical Communication Systems*, (Prentice Hall, N.Y.) c. 1993, the disclosure of which is incorporated herein by reference. Currently, the majority of optical communication systems are configured to carry an optical channel of a single wavelength over one or more optical waveguides. To convey information from plural sources, time-division multiplexing is frequently employed (TDM). In time-division multiplexing, a particular time slot is assigned to each information source, the complete signal being constructed from the signal portion collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded, e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. A WDM system employs plural optical signal channels, each channel being assigned a particular channel wavelength. In a WDM system, optical signal channels are generated, multiplexed to form an optical signal comprised of the individual optical signal channels, transmitted over a single waveguide, and demultiplexed such that each channel wavelength is individually routed to a designated receiver. Through the use of optical amplifiers, such as doped fiber amplifiers, plural optical channels are directly amplified simultaneously, facilitating the use of WDM systems in long-distance optical systems.

In many applications, such as optical LANs, cable television subscriber systems, and telecommunications networks, there is a need to route one or more channels of a multiplexed optical signal to different destinations. Such routing occurs when optical channels are sent to or withdrawn from an optical transmission line e.g., for sending optical channels between a terminal and an optical bus or routing long distance telecommunications traffic to individual cities. Additionally, optical routing must be sufficiently flexible to enable a variety of system configurations, permitting optical signal paths to be reconfigured in response to changing traffic pattern requirements. Thus, there is a need in the art for flexible and effective optical routing to enable practical implementation of wavelength division multiplexed optical communication systems.

SUMMARY OF THE INVENTION

The present invention provides reconfigurable wavelength division multiplexed systems which include configurable optical routing systems. Through the use of the configurable optical routing systems, optical channel traffic patterns may be flexibly and dynamically determined based on overall system conditions at any particular time. In one embodiment, the present invention provides a dynamically reconfigurable wavelength selector system for a wavelength division multiplexed optical communication system having N optical channels, where N is a whole number greater than or equal to 2. The optical routing system comprises an optical transmission medium having sufficient bandwidth to carry N optical channels. An optical transfer system optically communicates with the optical transmission medium and includes an input port for receiving at least one of the N optical channels from the optical transmission medium and at least first and second output ports. An optical switch is optically coupled to the first output port of the optical transfer system, the optical switch having at least first and second optical paths. The first optical path includes an optical filter comprised of at least one Bragg grating configured to reflect at least one optical channel back toward the optical transfer system. The reflected optical channel exits the optical transfer system through the second output port. The second switch optical path is configured to transmit at least the N optical channels, i.e., the channel configured to be reflected by the Bragg grating is transmitted through the second optical path. Switching means are provided, e.g., an electromechanical switch which couples an input optical signal to either the first optical path or the second optical path. A switch controller regulates the switching between the first and second optical paths. In an exemplary embodiment, the switch controller is supervised by an optical service channel signal.

In another aspect, the present invention provides a wavelength division multiplexed communication system with optical cross-connects for routing optical traffic between a pair of optical paths. The communication system includes N optical transmitters for creating N optical channels, each optical channel having a wavelength designation of $\lambda_i$ where i ranges from 1 to N and where N is a whole number greater than or equal to 2. The N optical transmitters are optically coupled to a first optical transmission path. A second optical transmission path is provided in the optical communication system coupled to M optical transmitters for creating M optical channels, each optical channel having a wavelength designation of $\lambda_j$ where j ranges from 1 to M, and where M is a whole number greater than or equal to 1.

A first optical transfer system is optically coupled to the first optical transmission path. The first optical transfer system includes an input port for receiving at least one of the N optical channels from the first optical transmission path and at least first and second output ports. In an exemplary embodiment, the optical transfer system comprises an optical circulator. A second optical transfer system is optically coupled to the second optical transmission path. The second optical transfer system includes an input port for receiving at least one of the M optical channels from the second optical transmission path and at least first and second output ports.

An optical path which includes an optical filter comprising one or more Bragg gratings is coupled to the first output port of the first optical transfer system and to the first output port of the second optical transfer system. The Bragg grating(s) is configured to reflect at least one $\lambda_j$ toward the second optical transfer system for exiting the second output port of the second optical transfer system. In this manner, the M optical channels which are not reflected by the Bragg grating(s) pass through the second output port of the first optical transfer system and the N optical channels which are not reflected by the at least one Bragg grating pass through the second output port of the second optical transfer system.

In a further embodiment, the optical cross-connects are employed as wavelength selective crosspoints in a m×n wavelength selective blocking or non-blocking networks. The optical network has m input ports, each carrying N optical channels, interconnected to n output ports through a plurality of wavelength-selective optical crosspoints. The n network output ports deliver any combination of the N channels input to the m network input ports. Each wavelength-selective optical crosspoint includes first and second optical transfer systems, each optical transfer system having a plurality of transfer system ports. An optical path interconnects the first and second optical transfer systems through a first transfer system port and a second transfer system port. The optical path includes N optical filters, each optical filter comprising at least one Bragg grating for to reflecting one of the N optical channels. The optical filter is configurable to select the Bragg grating to reflect one or more optical channels or to transmit all incident optical signals.

BRIEF DESCRIPTION OF THE DRAWINGS

FIG. 1A is a schematic representation of a WDM optical communication system including an optical routing system employing switchable wavelength selectors according to one embodiment of the present invention.

FIG. 1B is an enlarged schematic representation of a wavelength selector employed in the system of FIG. 1A.

DETAILED DESCRIPTION

Figure 1C:
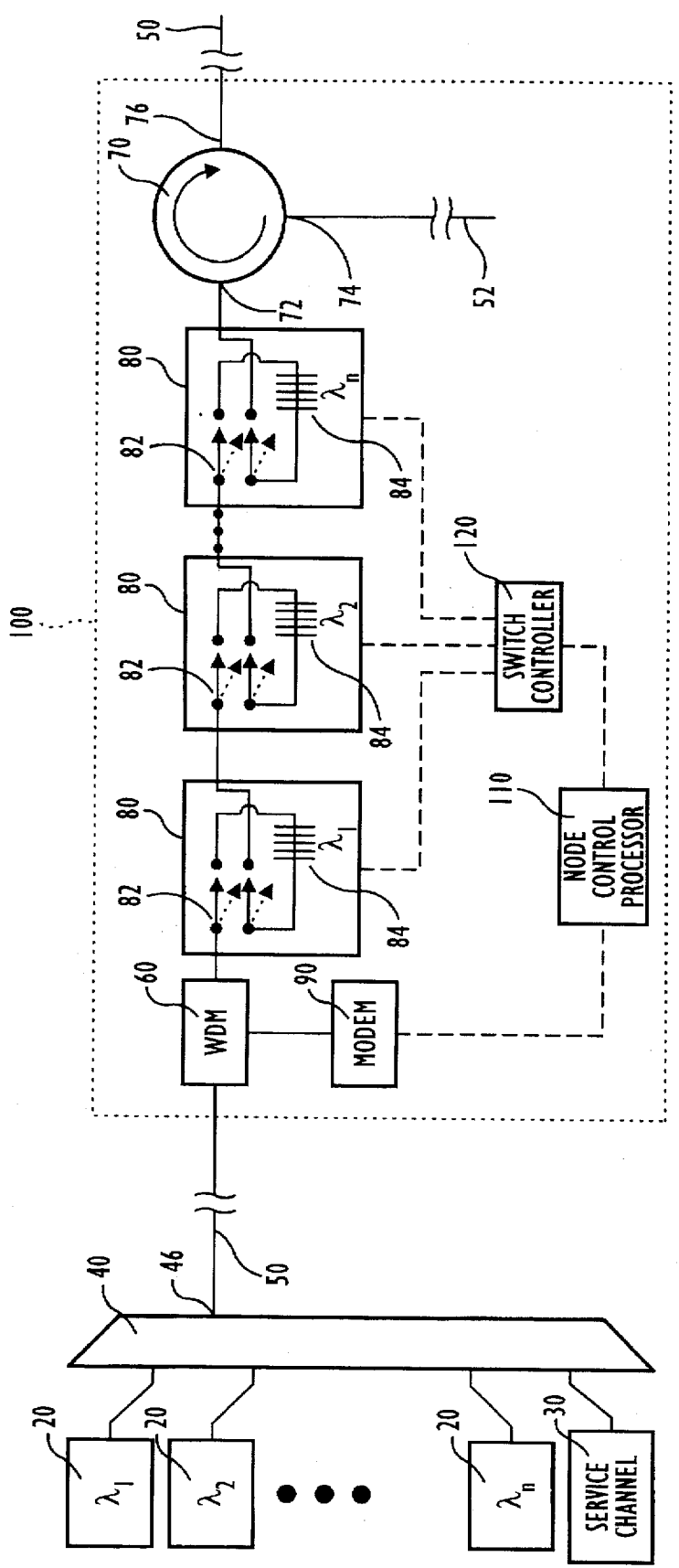
FIG. 1C is a schematic representation of a WDM optical communication system including an optical routing system employing switchable wavelength selectors according to a further embodiment of the present invention.

Turning now to the drawings in detail, in which like numerals indicate the same or similar elements, FIG. 1 depicts a wavelength division multiplexed (WDM) optical communication system 10 including an optical routing system according to one embodiment of the present invention. WDM system 10 includes a plurality of optical transmitters 20, each optical transmitter emitting an optical signal at an optical channel wavelength. Typically, the optical signal is coded with information, including, but not limited to, audio signals, video signals, and computer data. The WDM optical communication systems of FIG. 1 include N channels, where N is a whole number greater than or equal to 2. Exemplary values for N are 4, 8, and 16 optical channels.

Each optical transmitter 20 generally includes a laser, such as a DFB semiconductor laser, a laser controller, and a modulator for creation of an information-bearing optical signal. In an exemplary embodiment, the transmitter laser is a DFB semiconductor diode laser, generally comprising one or more III–V semiconductor materials, commercially available from a wide variety of suppliers such as Fujitsu, GEC Marconi, and Hewlett-Packard. The laser outputs an optical carrier signal at a particular channel wavelength. In one embodiment, at least one transmitter carrier signal corresponds to a wavelength selected by an optical filter in a wavelength selecting element positioned in an optical routing system downstream of the optical transmitter. A laser controller provides the required laser bias current as well as thermal control of the laser. Using thermal control, the precise operating wavelength of the laser is maintained, typically to within a one angstrom bandwidth.

The optical transmitter optionally includes a modulator for imparting information to the optical carrier signal. An exemplary modulator is an external modulator, such as a Mach-Zehnder modulator, employing a waveguiding medium whose refractive index changes according to the applied electrical field, i.e., a material exhibiting an electro-optic effect. In the Mach-Zehnder configuration, two optical interferometer paths are provided. An incoming optical carrier signal is split between the two optical paths. At least one path of the interferometer is phase modulated. When the signal is recombined at the output, the light from the paths either constructively or destructively interferes, depending upon the electrical field applied to the surrounding electrodes during the travel time of the carrier. This recombination creates an amplitude-modulated output optical signal. It is understood that while the above-described transmitters are exemplary, any transmitting element capable of producing optical signals for use in an optical communication system can be employed in the WDM systems of the present invention. Typically, the wavelengths emitted by optical transmitters 20 are selected to be within the 1500 nanometer range, the range in which the minimum signal attenuation occurs for silica-based fibers. More particularly, the wavelengths emitted by the optical transmitters are selected to be in the range from 1530 to 1560 nanometers. However, it is understood that the optical systems of the present invention can be used to mute optical signals of any selected wavelength.

When optical transmitters 20 form part of an existing optical system, a plurality of remodulators can be employed. Such remodulators operate to map a space division optical communication system, i.e., a system in which individual optical signals are physically separated in space by transmission on separate waveguides, onto a wavelength division optical communication system, i.e., a communication system in which individual optical signals are simultaneously transmitted in the same waveguide. The use of optical remodulators ensures compatibility of optical communication system 10 with currently-deployed transmission equipment. Further description of wavelength division multiplexed optical communication systems with remodulators is found in U.S. patent application Ser. No. 08/438,844, filed May 11, 1995 (now U.S. Pat. No. 5,504,609) and assigned to the instant assignee, the disclosure of which is incorporated by reference herein. Further description of optical transmitters which may be employed in the optical communication systems of the present invention are described in Gowar, *Optical Communication Systems*, incorporated by reference above. Generally, optical amplifiers (not shown) are used to increase the transmitted signal power following modulation.

Optionally, an optical service channel for monitoring and controlling the optical communication system can be provided. A service channel optical transmitter 30 produces a service channel optical signal. In an exemplary embodiment, the service channel is selected to have a wavelength different from the wavelengths selected for the payload optical channels. In one embodiment, the service channel signal is selected to be outside the 1530–1560 nm wavelength band selected for the payload channels; in particular, wavelengths in the 1600–1650 nm wavelength range can be selected. Although FIG. 1 illustrates the optical service channel originating at the same location as the transmitters for the payload optical channels, it is understood that the service channel optical signal can enter the WDM optical system at other points, if desired. System configurations for adding optical service channels to a WDM system are described in U.S. patent application Ser. No. 08/457,292, filed Jun. 1, 1995, (now U.S. Pat. No. 5,532,864) and assigned to the instant assignee, the disclosure of which is incorporated by reference herein.

Each optical signal produced by an optical transmitter (or an optical remodulator, if present) constitutes a channel in optical system 10. In one embodiment, the wavelength of the optical channel corresponds to a wavelength selected by the downstream wavelength selecting element. The optical signal channels output from transmitters 20 are brought together in multiplexer 40 for conveyance to optical waveguide 50. Multiplexer 40 combines plural optical channels from transmitters 20 and, optionally, from service channel 30 through input ports 42 onto a single output to create a multiplexed optical signal. Frequently, optical splitters used to divide a signal among plural outputs are used as optical multiplexers, operated in reverse fashion from the splitter. Exemplary optical splitters used in this manner for multiplexer 40 are selected from 1×N wideband single mode splitters available from IOT Integrierte Optik GmbH, Waghausel-Kirrlach, Germany, and fused fiber combiners available from Gould, Inc., Millersville, Md. Alternatively, optical routers can be used to combine optical signals in the systems of the present invention. An exemplary optical router is a WDM STIMAX®, available from Jobin Yvon, Longjumeau Cedax, France.

The combination of channels forms a multiplexed optical signal which is output to optical transmission path 50 through multiplexer output port 46. Optical transmission path 50 is typically an optical waveguide and is the principal transmission medium for the optical communication system. The optical waveguide is generally selected from single-mode optical fibers such as SMF-28, available from Corning, and TRUEWAVE, available from AT&T Corp. However, any optical waveguiding medium which is capable of transporting multiple optical wavelengths can be employed as waveguide 50 in optical system 10. Although not depicted in FIG. 1A, one or more optical amplifiers are optionally positioned along waveguide 50 to increase the strength of the multiplexed optical signal.

As the multiplexed signal travels through waveguide 50, it is desirable to retrieve the optical service channel at a given position in order to monitor system characteristics or control elements of the WDM system. As depicted in FIG. 1A, the optical service channel can optionally be selected by a wavelength division multiplexer 60 which selects the service channel wavelength and transmits the payload optical channels. Wavelength division multiplexer 60 is selected from any optical component which can selectively retrieve the optical service channel such as the WD1315 series WDM couplers, available from JDS-Fitel, Ontario, Canada. Alternatively, the wavelength routing system can be used to select the service channel.

Following selection of the service channel optical signal, the multiplexed signal containing the remaining optical channels enters the optical routing system for transferring selected optical channels from the transmission waveguide to a separate optical path. The multiplexed optical signal enters the routing system through optical transfer system 70. In an exemplary embodiment, the optical transfer system 70 is selected to be the depicted three-port optical circulator having an input port 72 and output ports 74 and 76. In the depicted circulator, optical signals input to port 72 are output through port 74, while signals input to port 74 are output to port 76. In this manner, optical signals are rotated through the optical circulator in the illustrated circulating direction. Exemplary optical circulators include those commercially available from JDS-Fitel, Ontario, Canada, and E-Tek, San Jose, Calif.

Following optical transfer system output port 74, one or more wavelength selectors 80 are positioned in the output path of the optical signals. Each wavelength selector includes an optical switch 82 having a closed position, as depicted in FIG. 1A, and a bypass position, as depicted in FIG. 1B. Exemplary optical switches include SW2B bypass switches commercially available from JDS-Fitel. In the closed position, the optical signals travel through an optical path which is intersected by an optical filter 84.

Optical filter 84 includes at least one Bragg grating configured to select an optical channel wavelength for reflection back through port 74 of the optical transfer system. Preferably, the Bragg grating comprises a series of photoinduced refractive index perturbations in an optical fiber which causes the reflection of optical signals within a selected wavelength band. Bragg gratings suitable for use in the optical system of the present invention are described in Morey et al., "Photoinduced Bragg Gratings in Optical Fibers," *Optics and Photonics News*, February 1994, pp. 8–14, the disclosure of which is incorporated by reference herein. In this manner, the selected optical signal is routed through output port 76 of the optical transfer system onto optical transmission path 50. The selected optical signal is optionally routed to a receiver for conversion to an electrical signal or routed to another optical communication network.

In the bypass position of FIG. 1B, optical signals travel along an optical path which is configured to transmit all the optical channels in WDM system 10. To enable selection of any combination of optical channels in the WDM system, plural wavelength selectors 80 are serially positioned in the output path of optical signals emerging from port 74 of the optical transfer system, as depicted in FIG. 1A. Each wavelength selector includes an optical filter comprising a Bragg grating. Each grating is configured to reflect one of the channel wavelengths, $\lambda_1$ through $\lambda_n$, where n=N. In an exemplary embodiment, N wavelength selectors are provided for a WDM system with N channels. Through the appropriate positioning of each individual wavelength selector switch in the closed position ("select grating") or bypass position ("transmit all incident signals") any or all of the optical channels can be selected for routing onto transfer system output transmission path 52. For a system with N optical channels, a total of $2^N$ channel combinations can be selected through the configuration depicted in FIG. 1A.

Alternatively, a directional coupler can be employed as the optical transfer system 70. A first output port of a first directional coupler, such as a fused fiber combiner is coupled to a wavelength selector. The reflected wavelength exits onto an optical path coupled to a second output port of the directional coupler. Similarly, a polarization coupler can be employed using the same configuration as the directional coupler. Polarization couplers are described in Guy et al., *Electronics Letters*, Vol. 30, No. 18, p. 1512–1513, the disclosure of which is incorporated by reference herein.

Alternatively, a single optical filter can be configured to reflect more than one optical channel. Such a configuration is particularly desirable when the payload channels of the optical system have wavelengths located within a particular wavelength band and an optical service channel has a wavelength located outside the payload channel wavelength band. For such an embodiment, two wavelength selectors can be employed. One wavelength selector includes a selectable filter configured to reflect the entire payload wavelength band while the other wavelength selector includes a selectable filter configured to reflect the service channel wavelength. This configuration easily separates an optical service channel from the payload optical channels.

It is understood that the depicted optical switches of FIGS. 1A and 1B are exemplary. Other electromechanical optical switches as well as electro-optic and thermo-optic switches having a variety of switching configurations can also be employed in the wavelength selectors of the present invention. Exemplary optical switches and switch configurations enable the selection of different optical path in fewer than 50 milliseconds, with times of fewer than 15 milliseconds being preferred. Alternatively, other techniques can be employed by the wavelength selectors to create the "select grating" and "transmit all incident signals" alternatives. For example, the grating of the optical filter can be temperature tuned such that the reflection wavelength is shifted in or out of the optical channel band. In an exemplary embodiment, the out-of-band position is a wavelength band situated between adjacent optical channels. The reflection wavelength positioned in the optical channel band corresponds to the "select grating" position while the reflection wavelength positioned out of the optical channel band corresponds to the "transmit all incident signals" position of optical switch 82. In another technique, the grating of the optical filter is mechanically strained to shift the reflection wavelength in or out of the optical channel band. In this manner, control of either temperature or mechanical strain functions as the optical switch of the wavelength selector. It is understood that any technique which can route incident optical signals through a wavelength selecting element or through an element which transmits all incident signals, including techniques which modify the element itself to create these alternatives, e.g., a tunable Fabry-Perot filter, can be employed in the wavelength selectors of the present invention.

To optionally enable the WDM optical communication system to be dynamically reconfigurable, the wavelength selector optical switches can be externally controlled. In the exemplary embodiment of FIG. 1A, the dotted border 100 envelops optical routing elements within an optical node. The wavelength selector optical switches are controlled through control signals carried by the service channel optical signal. As previously described, the service channel optical signal can optionally be removed by wavelength division multiplexer 60. The optical signal is received by service channel modem 90 and converted to an electrical signal by an optoelectronic conversion element. The dashed path lines downstream of the modem indicate electrical signal paths, in contrast to the solid lines indicating optical signal paths. After clock and data recovery, the electrical signal is formatted and routed to a modem microprocessor. The processed electrical signal is sent to node control processor 110 through modem output path 92. The node control processor 110 is a microprocessor which controls the activities which take place within the node. To perform the optical switching, the node control processor signals switch controller 120 to position optical switches 82 to select the desired optical channels or to transmit all of the optical signals which emerge from transfer system output port 74. Exemplary switch controllers include the D8T switch controller, commercially available from JDS-Fitel. Alternatively, the switch controllers may be contained in the individual wavelength selector switches themselves. In this embodiment, the node control processor directly communicates with the individual optical switches, eliminating the need for a separate switch controller.

While the above-described technique for controlling the optical switching is exemplary, it is understood that any method for controlling the wavelength selectors to select a wavelength or to transmit all incident wavelengths can be employed in the optical systems of the present invention. In particular, when the optical service channel is used to control one or more optical switches, it is understood that any technique which converts the service channel optical signal to an electrical signal and uses the electrical signal for control of the wavelength selectors is within the scope of the present invention.

FIG. 1C depicts an alternative embodiment of the wavelength division multiplexed optical system of the present invention. In this embodiment, the switchable wavelength selectors 80 are positioned in an optical path preceding optical transfer system 70. For this configuration, positioning a switch to the "select grating" position will cause an incident optical signal from transmission path 50 having the same wavelength to be reflected away from optical transfer system 70. In this manner, only those signals which are not selected by wavelength selectors 80 will be permitted to continue through to output port 76 and process along transmission path 50. Optical transmission path 50 is optically coupled to an optical receiving system (not shown) for conversion of optical signals to electrical signals. The optical receiving system typically employs a demultiplexer (when a multiplexed signal exits through port 76) coupled to a receiver.

Alternatively, transfer system port 74 may be used as an input port for optical signals entering the optical system from optical transmission path 52. When a wavelength selector which includes a Bragg grating having a reflection wavelength identical to the incident optical signal from port 74 is switched to the "select grating" position, the incident wavelength is reflected back to the optical transfer system through port 72. The reflected signal exits onto optical transmission path 50 through output port 76.

Figure 2:
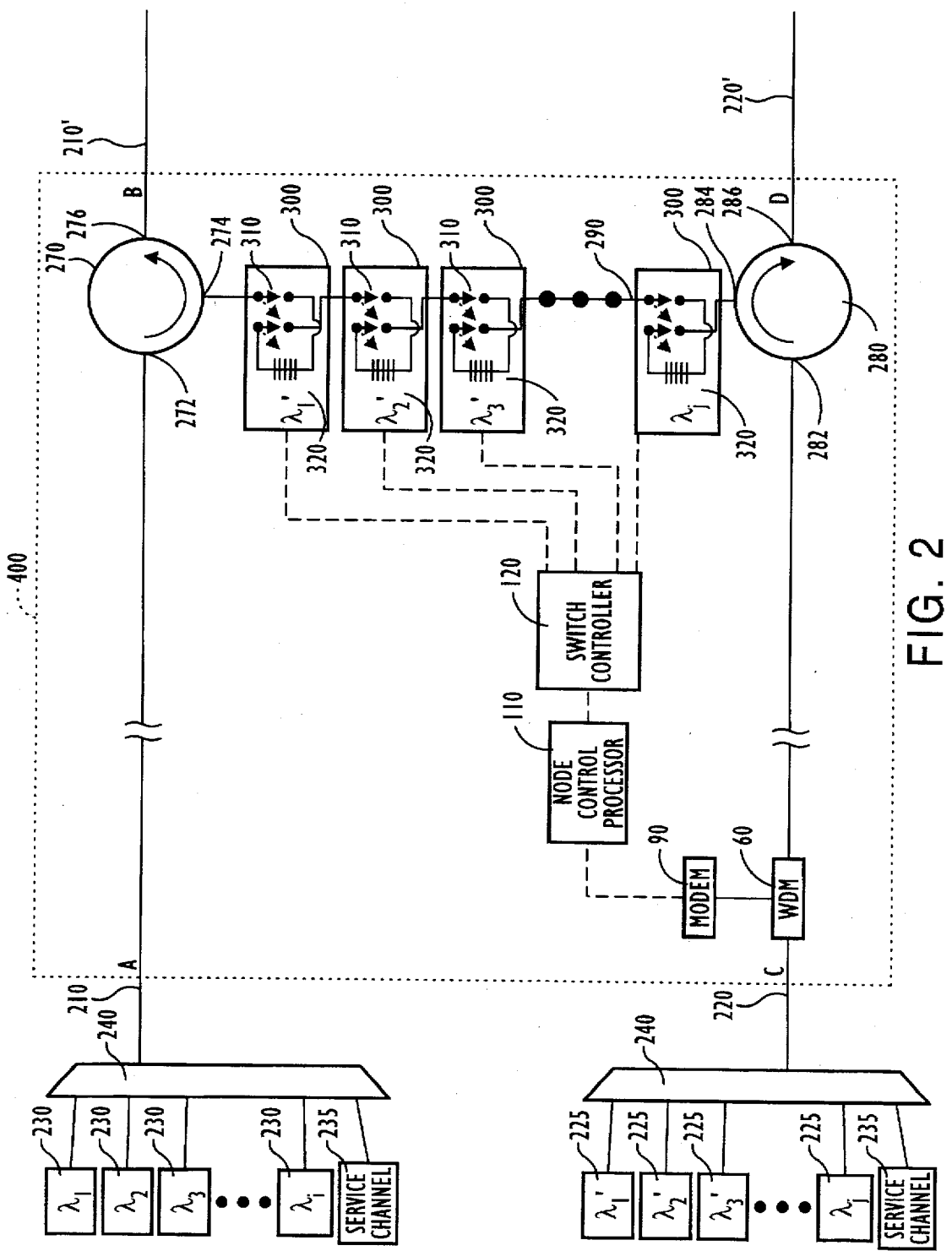
FIG. 2 is a schematic representation of a WDM optical communication system employing an optical cross-connect according to a further embodiment of the present invention.

FIG. 2 depicts a further embodiment of an optical routing system according to the present invention employing an optical cross-connect for routing optical traffic between transmission paths in a wavelength division multiplexed optical communication system. In optical system 200 of FIG. 2, first and second optical transmission paths 210 and 220 each optically communicate with a plurality of optical transmitters, respectively labeled 230 and 225, through multiplexers 240. Optionally, service channel transmitters 235 can be connected to multiplexers 240 for sending optical service channels to the respective optical transmission paths. The optical devices and components described in this embodiment can be selected from the devices components described with respect to the embodiments of FIG. 1. The optical transmitters communicating with transmission path 210 transmit optical wavelengths designated $\lambda_1$ through $\lambda_i$ while the optical transmitters communicating with transmission path 220 transmit optical channels $\lambda_1'$ through $\lambda_j'$. The optical wavelengths $\lambda_1$ and $\lambda_1'$ and wavelengths $\lambda_2$ and $\lambda_2'$ etc. through $\lambda_i$ and $\lambda_j$ can be selected to correspond to the same channel carrier wavelength or different channel carrier wavelengths, depending upon overall system requirements. The optical service channel can be selected to have one of the wavelengths $\lambda_1$ through $\lambda_i$ for transmission path 210 or one of the wavelengths channels $\lambda_1'$ through $\lambda_j$ for transmission path 220; alternatively, the service channel wavelength can be selected to have a wavelength different from wavelengths $\lambda_1$ through $\lambda_i$ or $\lambda_1'$ through $\lambda_j$, depending upon the channel capacity of the WDM system.

The optical signals carried on transmission line 210 enter the first optical transfer system 270 while optical signals carded on transmission line 220 enter the second optical transfer system 280. As depicted in FIG. 2, optical transfer systems 270 and 280 can be selected to be optical circulators, although directional coupler systems as described above can also be employed. In an exemplary embodiment, the circulating directions of the circulators are selected to be opposite from one another, e.g., circulator 270 rotates optical signals in a counter-clockwise direction while the circulator 280 rotates optical signals in a clockwise direction. Each transfer system includes at least three optical ports, 272, 274, and 276 for transfer system 270 and optical ports 282, 284, and 286 for transfer system 280. Optical signals which enter input ports 272 exit through port 274 while optical signals which enter port 282 exit through port 284. Optical signals which enter transfer system 270 through port 274 exit through port 276 for continuing along the optical transmission path 210'. Similarly, optical signals which enter transfer system 280 through port 284 exit through port 286 for continuing along the optical transmission path 220'.

Optically communicating with ports 274 and 284 is optical path 290. Typically, optical path 290 is an optical fiber connected at one end to port 274 and at the other end to port 284. Positioned along optical path 290 are one or more wavelength selectors 300. Each wavelength selector includes an optical switch 310 having a closed position, as depicted in and a bypass position, as described in detail above with respect to optical switches 80 of FIGS. 1A and 1B. In the closed position, the optical signals travel through an optical path which is intersected by an optical filter 320. Optical filter 320 includes at least one Bragg grating configured to select an optical channel wavelength for reflection. In the configuration of FIG. 2, the optical filters are configured to reflect wavelengths corresponding to channel wavelengths $\lambda_1'$ through $\lambda_j$ from transmission path 220. When the channel wavelengths of optical transmitters 230 and 225 are coextensive, i.e., the wavelength of $\lambda_1$ is the same as the wavelength of $\lambda_1'$, the optical filter reflects both channels back towards their respective originating optical transfer systems for exiting through ports 276 and 286, respectively.

Alternatively, the optical switches of wavelength selectors 320 can be eliminated to create one or more fixed optical filters including one or more Bragg gratings in optical transmission path 290. Such a configuration is used when permanent selection of one or more wavelengths to remain on the same optical transmission path is desired i.e., when one or more channels from transmission path 210 are always to continue through to transmission path 210' or when one or more channels from transmission path 220 are always to continue through to transmission path 220'.

Alternatively, optical filtering elements other than Bragg gratings can be employed in the optical filters of FIG. 2. Such optical filtering elements include Fabry-Perot filters and any other optical filter which can be configured to reflect a specific wavelength band. As in the embodiment of FIGS. 1A–1C, when Bragg gratings are employed as the optical filtering elements, the gratings can be thermally or mechanically tuned to select a wavelength band which does not reflect any of the incident optical signals, thereby eliminating the need for optical path switching.

As in the embodiment of FIG. 1A, the service channel optical signal can be used to control the optical switches of the wavelength selectors. In an exemplary embodiment, the service channel optical signal is removed by wavelength division multiplexer 60 and converted to an electrical signal by service channel modem 90. The electrical signal is used by node control processor to control switch controller 120 for selecting the positions of the optical switches in wavelength selectors 300. Although the service channel from transmission path 220 is depicted in the embodiment of FIG. 2, it is understood that the service channel from transmission path 210 can be connected to a similar system for switching wavelength selectors 300. Alternatively, when the sets of channel wavelengths respectively carried by transmission lines 210 and 220 are different, two sets of wavelength selectors can be provided in optical path 290. Each set of wavelength selectors includes optical filters configured to reflect one or more of the optical channels from one of the transmission paths. The optical service channel carried by transmission path 210 is used to control the set of wavelength selectors configured to reflect the channels launched by transmitters 230 (using the same configuration shown for the optical service channel of transmission path 220, not depicted in FIG. 2), while the optical service channel carried by transmission path 220 is used to control the sef of wavelength selectors configured to reflect the channels launched by transmitters 225. Alternatively, the optical service channel carried by transmission path 210 is used to control the set of wavelength selectors configured to reflect the channels launched by transmitters 225 while the optical service channel carried by transmission path 220 is used to control the set of wavelength selectors configured to reflect the channels launched by transmitters 230. In an exemplary embodiment, a system with N optical channels produced by transmitters 230 and M optical channels produced by transmitters 225 includes N+M wavelength selectors. For this configuration, a total of $2^{(N+M)}$ channel combinations can be selected for routing.

One or more optical signal receivers (not shown) are optically coupled to transmission path 210'. Similarly, one or more optical signal receivers (not shown) are optically coupled to transmission path 220'. When a multiplexed signal is sent to the receivers, a demultiplexer is interposed between the transmission path and the receivers. Optionally, the signal may be optically amplified before it reaches the receiver. Optical amplifiers can be interposed on transmission paths 210, 210', 220, and 220' based on overall system requirements. The optical signal receiver generally detects the optical signal and converts it to an electrical signal, typically through the use of a photodiode device. Various optical receivers suitable for use in the optical systems of the present invention are described in Gowar, *Optical Communication Systems*, discussed above.

In the optical communication systems of the present invention, the receiver will frequently be part of an existing optical communication system to which the optical channels are routed. Consequently, the optical systems described herein can function with numerous types of receivers to ensure compatibility with existing optical equipment. In this manner, the optical systems of the present invention are said to be "transparent," i.e., the optical signals can be manipulated regardless of their various data rates, architecture, or protocol.

The operation of the optical cross-connect routing system will be described for several combinations of optical channels and optical filters. In one embodiment, optical transmitters 230 create N optical channels with wavelength designations $\lambda_1$ through $\lambda_i$ where i=N. M different optical channels with wavelength designations $\lambda_1'$ through $\lambda_j'$ where j=M, are created by optical transmitters 225. M wavelength selectors 300 are positioned in optical path 290, each wavelength selector having a filter with a Bragg grating for reflecting one of the M optical channels. All of the wavelength selectors are positioned in the bypass mode with the exception of the wavelength selector having a grating configured to reflect $\lambda_1'$ which is set in the closed position such that the optical signals encounter the optical filter. For this system configuration, all N channels produced by transmitters 230 will pass into the first transfer system 270, exit through port 274, propagate unimpeded along optical path 290 and enter the second optical transfer system through port 284. The M optical channels produced by transmitters 225 pass into second transfer system 280, exit through port 284 and encounter wavelength selectors 300. All M optical channels with the exception of $\lambda_1'$, i.e., optical channels with wavelengths $\lambda_2'$ through $\lambda_j$ enter optical transfer system 270 through port 274, exiting onto transmission path 210' through port 276. The optical channel with wavelength $\lambda_1'$ be reflected by the wavelength selector positioned to select $\lambda_1'$ and return to the second optical transfer system through port 284. The N optical channels $\lambda_1$ through $\lambda_i$ along with the reflected $\lambda_1'$ are output onto transmission path 220' through second transfer system port 286.

For the preceding configuration, if all the wavelength selectors are positioned with their optical switches in the bypass position, the N optical channels of transmission path 210 will cross over to the second optical transfer system to be output onto transmission path 220'. Similarly, the M optical channels of transmission path 220 will cross over to the first optical transfer system to be output onto transmission path 210'. In this manner, the optical traffic of two transmission paths is fully interchanged.

In another embodiment, the optical system can be configured such that none of the optical channels cross over from one optical transmission path to the other. For a system with N optical channels produced by transmitters 230 and M different optical channels produced by transmitters 225 with M+N wavelength selectors, all of which are positioned in the "select grating" position, the N optical channels will pass from transmission path 210 to transmission path 210' while the M optical channels will pass from transmission path 220 to transmission path 220'. In this manner, the optical traffic from the N transmission system and the optical traffic from the M transmission system will not be interchanged. When the channel wavelengths from the two transmission systems are the same, i.e., $\lambda_1$ has the same wavelength as $\lambda_1'$, $\lambda_2$ has the same wavelength as $\lambda_2'$, etc., and N=M, the same result can be achieved with N wavelength selectors, each set in the "select grating" position.

In another embodiment, the optical cross-connects of the present invention can be used to multiplex a single channel, such as a service channel, into a transmission path while demultiplexing a service channel having the same wavelength from a multiplexed signal which includes the service channel. In an exemplary embodiment of this configuration, N=8 and M=1 for the depicted system of FIG. 2. Positioned on optical path 290 are N−1=7 fixed Bragg gratings, each grating configured to reflect one of the optical channels emitted by transmitters 230. The remaining channel of the N optical channels, for which there is no corresponding Bragg grating positioned in path 290, is selected to have the same wavelength as the optical channel emitted by an M transmitter 225. For this configuration, transmission path 210 and 210' are used as the primary optical transmission paths for the optical communication system, while transmission paths 220 and 220' are used as multiplexing and demultiplexing paths for the optical communication system. The N=8 channel multiplexed signal enters optical transfer system 270 through port 272 and exits onto output path 290 through port 274. Seven of the eight channels, e.g., the payload optical signals, are reflected back towards the first optical transfer system where they exit through port 276 to continue on transmission path 210'. The channel to be demultiplexed continues on optical path 290, exiting through the second optical transfer system output port 286 onto path 220'. The M channel to be multiplexed to the (N−1) optical channels, e.g., a new optical service channel at the same wavelength as the demultiplexed channel, enters onto optical path 290 through second optical transfer system 280. The M channel joins the N−1 optical channels, exiting onto primary transmission path 210' through the first optical transfer system 270.

Figure 3:
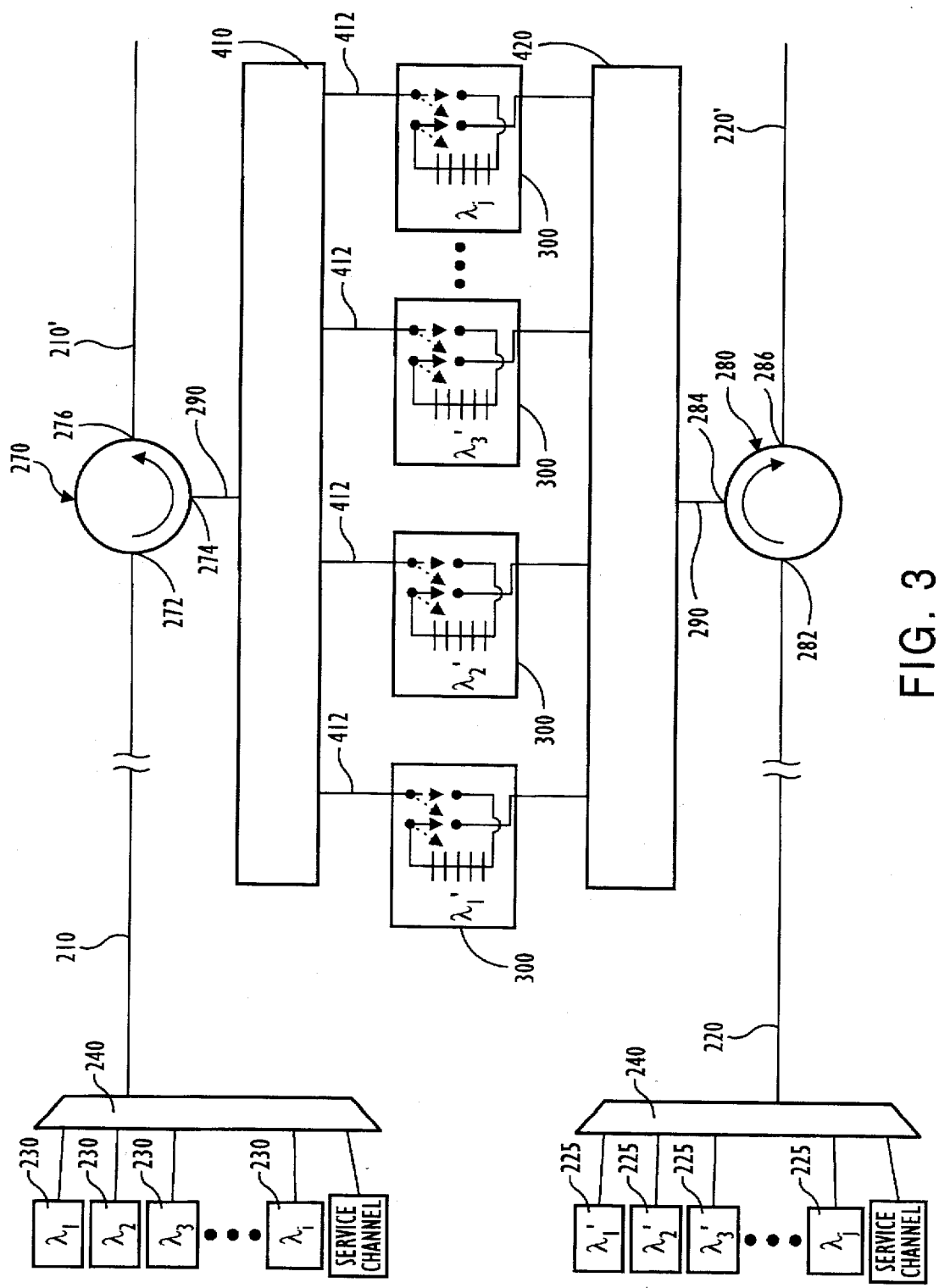
FIG. 3 is a schematic representation of a WDM optical communication system employing an optical cross-connect according to a further embodiment of the present invention.

In a further embodiment of the present invention, optical cross-connect of the present invention can include demultiplexers and multiplexers such that the wavelength selectors can be arranged in parallel, instead of the series arrangement of FIG. 2. This embodiment is schematically depicted in FIG. 3. As in the embodiment of FIG. 2, N optical transmitters 230 and M optical transmitters 225 respectively output optical traffic onto transmission paths 210 and 220. The N optical channels enter first optical transfer system 270 through port 272 and the M optical channels enter second optical transfer system 280 through port 282. The N optical channels are output onto optical path 290 where they enter demultiplexer 410. Demultiplexer 410 separates the N optical channels according to wavelength, each of the different wavelengths exiting through a separate demultiplexer output port 412. Each of the demultiplexer outputs 412 is connected to a wavelength selector 300 which includes an optical filtering element configured to reflect the optical channel output by the particular demultiplexer port. In this manner, wavelength selectors 300 are arranged in parallel. In a similar fashion, the M optical channels are output onto optical path 290 through second transfer system port 284. Demultiplexer 420 separates the M optical channels according to wavelength, each of the different wavelengths exiting through a separate demultiplexer output port 422. When the wavelength selectors are arranged in parallel, the switching of any one wavelength selector does not interrupt service for remaining optical channels. Alternatively, one of demultiplexers 410 and 420 can be substituted with an optical splitter. When one splitter is employed, the remaining demultiplexer acts as a filter for the multiplexed wavelengths output by the splitter to ensure proper wavelength selection through the cross-connect. The demultiplexers are selected from any optical device which takes an input multiplexed signal and separates each constituent signal, placing each constituent signal on a separate output path. An exemplary demultiplexer is the optical router WDM STIMAX®, available from Jobin Yvon, Longjumeaeau Cedax, France.

The optical cross-connects of the present invention can be used as components in a cross-connect network to create a larger number of channel-routing options. Generally, the wavelength selective cross-connects of FIGS. 2 and 3 can be used as wavelength selective crosspoints to create an m×n wavelength selective blocking or non-blocking cross-connect network, where m represents the number of input ports and n represents the number of output ports. As used herein, the expression "non-blocking network" describes a system in which a path can be provided from any input port to any output port without disrupting existing connections. For the wavelength division multiplexed optical communication systems of the present invention, the blocking or non-blocking networks are additionally capable of routing an individual channel from any input port to any output port, i.e., the network includes wavelength-selective crosspoints in order to select individual channels from a multiplexed input signal. Further descriptions of blocking and non-blocking networks are found in Briley, *Introduction to Telephone Switching*, (Addison-Wesley, Reading, Mass.), c. 1983, the disclosure of which is incorporated herein by reference, and Smyth, "Nonblocking Photonic Switch Networks," *IEEE J. Selected Areas in Communications*, Vol. 6, No. 7, August, 1988, the disclosure of which is incorporated by reference herein.

Figure 4:
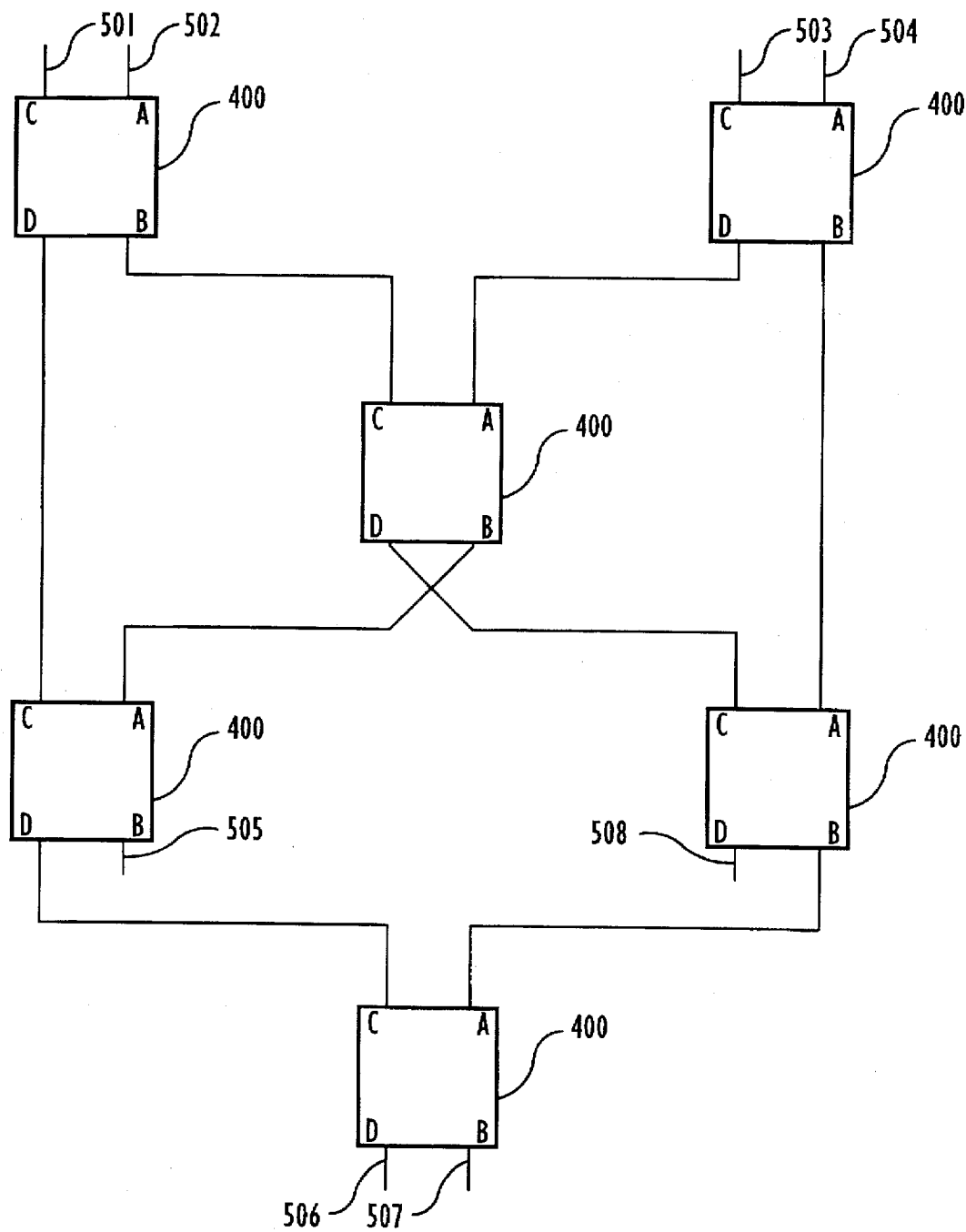
FIG. 4 is a schematic representation of a wavelength-selective blocking m×n network to a further embodiment of the present invention.

An exemplary m×n blocking network which uses wavelength-selective crosspoints is schematically depicted in FIG. 4. FIG. 4 depicts a 4×4 network using six four-port wavelength-selective crosspoints 400. Each wavelength selective crosspoint 400 can be selected from the optical cross-connects of FIG. 2 in which the dotted line encloses a four-port optical cross-connect 400 with ports labeled A, B, C and D, as shown. This four-port optical cross-connect can be used as a building block to create a wide variety of switching arrays.

For the configuration of FIG. 4, the operation of the wavelength selective non-blocking network will be described using a WDM system with N channels where N=8. Eight optical channels respectively enter the network through ports 501,502, 503, and 504. Each set of optical channels uses the same eight optical carrier wavelengths, i.e., $\lambda_1$ has the same wavelength as $\lambda_1'$, $\lambda_2$ has the same wavelength as $\lambda_2'$, etc. Eight optical filters 320 are positioned between optical transfer systems 270 and 280 of cross-connects 400, each filter capable of being switched to reflect one of the eight optical channels or to transmit all incident optical channels, as described in conjunction with FIG. 2. The network of FIG. 3 allows each of the N channels at input ports 501–504 to be multiplexed with any other channel of a different wavelength coming from either the same input port or from a different output port at one of the output ports 505, 506, 507, or 508. For the configuration of FIG. 3, there are $(4!)^N$ channel combinations. For N=8, there are approximately $1.1 \times 10^{11}$ channel combinations which can exit ports 505–508 using only 6×8=48 optical filtering elements, each of which is configurable in the "select grating" or "transmit all incident channels" positions.

While the 4×4 blocking network of FIG. 4 is exemplary, it is understood that the wavelength selective crosspoints of the present invention can be employed in any blocking or non-blocking network configuration, such as the networks discussed in the Smyth reference, incorporated by reference, above, to provide the ability to select component wavelengths of an input multiplexed signal for network routing.

While the foregoing invention has been described in terms of the embodiments discussed above, numerous variations are possible. Accordingly, modifications and changes such as those suggested above, but not limited thereto, are considered to be within the scope of following claims.

What is claimed is:

1. A wavelength division multiplexed optical communication system with an optical cross-connect comprising:

N optical transmitters for creating N optical channels, each optical channel having a wavelength designation of $\lambda_i$ where i ranges from 1 to N, where N is a whole number greater than or equal to 2, the N optical transmitters being optically coupled to a first optical transmission path;

M optical transmitters for creating M optical channels, each optical channel having a wavelength designation of $\lambda_j$ where j ranges from 1 to M, where M is a whole number greater than or equal to 2, the M optical transmitters being optically coupled to a second optical transmission path;

a first optical transfer system optically coupled to the first optical transmission path, the first optical transfer system having an input port for receiving at least one of the N optical channels from the first optical transmission path and at least first and second output ports;

a second optical transfer system optically coupled to the second optical transmission path, the second optical transfer system having an input port for receiving at least one of the M optical channels from the second optical transmission path and at least first and second output ports;

an optical path including an optical filter comprising at least one Bragg grating coupled to the first output port of the first optical transfer system and to the first output port of the second optical transfer system, the at least one Bragg grating configured to reflect at least one $\lambda_j$ toward the second optical transfer system for exiting the second output port of the second optical transfer system;

the first and second optical transfer systems and the optical path being configured such that the M optical channels which are not reflected by the at least one Bragg grating pass through the second output port of the first optical transfer system and the N optical channels which are not reflected by the at least one Bragg grating pass through the second output port of the second optical transfer system;

at least one optical receiver optically communicating with the second output port of the first optical transfer system; and at least one optical receiver optically communicating with the second output port of the second optical transfer system.

2. A wavelength division multiplexed optical communication system with an optical cross-connect according to claim 1, wherein $\lambda_j$ corresponds to an optical channel wavelength of one of the N optical channels and $\lambda_j$ also corresponds to an optical channel wavelength of one of the M optical channels such that one channel from N optical channels is reflected back towards the first optical transfer system and one channel from the M optical channels is reflected back toward the second optical transfer system.

3. A wavelength division multiplexed optical communication system with an optical cross-connect according to claim 1 wherein the optical filter is positioned within a wavelength selector, the wavelength selector including means to select the Bragg grating reflection wavelength or to transmit the N optical channels and the M optical channels.

4. A wavelength division multiplexed optical communication system with an optical cross-connect according to claim 3 wherein the means to select the Bragg grating comprises an optical switch having first and second optical paths, the first optical path having the Bragg grating positioned therein and the second optical path configured to transmit the N optical channels and the M optical channels, the optical switch including switching means for coupling an input optical signal to either the first optical path or the second optical path.

5. A wavelength division multiplexed optical communication system with an optical cross-connect according to claim 3 wherein N wavelength selectors are provided, each of the N wavelength selectors including an optical filter for reflecting one of the N optical channels.

6. A wavelength division multiplexed optical communication system with an optical cross-connect according to claim 3 wherein M wavelength selectors are provided, each of the M wavelength selectors including an optical filter for reflecting one of the M optical channels.

7. A wavelength division multiplexed optical communication system with an optical cross-connect according to claim 3 wherein N+M wavelength selectors are provided, each of the N wavelength selectors including an optical filter for reflecting one of the N optical channels and each of the M wavelength selectors including an optical filter for reflecting one of the M optical channels.

8. A wavelength division multiplexed optical communication system with an optical cross-connect according to claim 1 wherein the first and second optical transfer systems comprise optical circulators.

9. A wavelength division multiplexed optical communication system with an optical cross-connect comprising:

N optical transmitters for creating N optical channels, each optical channel having a wavelength designation of $\lambda_i$ where i ranges from 1 to N, where N is a whole number greater than or equal to 2, the N optical transmitters being optically coupled to a first optical transmission path;

M optical transmitters for creating M optical channels, each optical channel having a wavelength designation of $\lambda_j$ where j ranges from 1 to M, where M is a whole number greater than or equal to 2, the M optical transmitters being optically coupled to a second optical transmission path;

a first optical transfer system optically coupled to the first optical transmission path, the first optical transfer system having an input port for receiving at least one of the N optical channels from the first optical transmission path and at least first and second output ports;

a second optical transfer system optically coupled to the second optical transmission path, the second optical transfer system having an input port for receiving at least one of the M optical channels from the second optical transmission path and at least first and second output ports;

an optical path including an optical filter comprising at least one Bragg grating coupled to the first output port of the first optical transfer system and to the first output port of the second optical transfer system, the at least one Bragg grating configured to reflect at least one $\lambda_1$ toward the first optical transfer system for exiting the second output port of the first optical transfer system; the first and second optical transfer systems and the optical path being configured such that the M optical channels which are not reflected by the at least one Bragg grating pass through the second output port of the first optical transfer system and the N optical channels which are not reflected by the at least one Bragg grating pass through the second output port of the second optical transfer system;

at least one optical receiver optically communicating with the second output port of the first optical transfer system; and at least one optical receiver optically communicating with the second output port of the second optical transfer system.

10. A wavelength division multiplexed optical communication system with an optical cross-connect comprising:

N optical transmitters for creating N optical channels, each optical channel having a wavelength designation of $\lambda_i$ where i ranges from 1 to N, where N is a whole number greater than or equal to 2, the N optical transmitters being optically coupled to a first optical transmission path;

an M optical transmitter for creating an M optical channel having a wavelength designation of $\lambda_j$, the M optical transmitter being optically coupled to a second optical transmission path;

a first optical transfer system optically coupled to the first optical transmission path, the first optical transfer system having an input port for receiving at least one of the N optical channels from the first optical transmission path and at least first and second output ports;

a second optical transfer system optically coupled to the second optical transmission path, the second optical transfer system having an input port for receiving the M optical channel from the second optical transmission path and at least first and second output ports;

an optical path coupled to the first output port of the first optical transfer system and to the first output port of the second optical transfer system, the optical path including at least one optical filter including at least one grating for reflecting N−1 optical channels back toward the first optical transfer system, the remaining N channel having the same wavelength as the $\lambda_j$ wavelength emitted by the M optical transmitter;

the first and second optical transfer systems and the optical path being configured such that the M optical channel passes through the second output port of the first optical transfer system and the optical channel of the N optical channels which is not reflected by the optical filter passes through the second output port of the second optical transfer system;

at least one optical receiver optically communicating with the second outputport of the first optical transfer system; and at least one optical receiver optically communicating with the second output port of the second optical transfer system.

11. A wavelength division multiplexed optical communication system including a dynamically reconfigurable optical routing system, the wavelength division multiplexed optical communication system having N optical channels, where N is a whole number greater than or equal to 2, comprising:

an optical transmission medium having sufficient bandwidth to carry N optical channels and an optical service channel having a wavelength different from the wavelength of any of the N optical channels;

a dynamically reconfigurable optical routing system optically communicating with the optical transmission medium including:

an optical transfer system optically communicating with the optical transmission medium, the optical transfer system having an input port for receiving at least one of the N optical channels from the optical transmission medium and at least first and second output ports;

at least one configurable optical filter optically coupled to the first output port of the optical transfer system, the optical filter comprising at least one Bragg grating configurable to reflect at least one optical channel toward the optical transfer system for exiting the second output port of the optical transfer system and configuring means for configuring the Bragg grating selected from the group of optical switches, thermal tuners and strain tuners;

a controller for selectively controlling the Bragg grating configuring means;

an optical-to-electrical signal converter electrically communicating with the controller for receiving an optical control signal from an optical service channel and outputting an electrical control signal to the controller; and at least one optical receiver optically communicating with each of the output ports of the optical transfer system for receiving optical signals output through the output ports.

12. A wavelength division multiplexed optical communication system as recited in claim 11 wherein the optical transfer system includes an optical coupler.

* * * * *